United States Patent

[11] 3,597,904

| [72] | Inventors | Karl Folke Olof Jakobsson;<br>Bo Albert Voss-Schrader, both of Taby,<br>Sweden |
|---|---|---|
| [21] | Appl. No. | 823,836 |
| [22] | Filed | May 12, 1969 |
| [45] | Patented | Aug. 10, 1971 |
| [73] | Assignee | Aktiebelaget Celleco<br>Tumba, Sweden |
| [32] | Priority | May 14, 1968 |
| [33] | | Sweden |
| [31] | | 646/68 |

[54] APPARATUS FOR LIQUID-GAS SEPARATION
2 Claims, 1 Drawing Fig.

[52] U.S. Cl. ..................................................... 55/408
[51] Int. Cl. ...................................................... B01d 52/24
[50] Field of Search........................................... 55/299,
303, 406, 408, 409

[56] References Cited
UNITED STATES PATENTS
2,888,097 5/1959 Scheffler ...................... 55/400 X 3,323,465 6/1957 Stillebroer .................... 103/2 (A) X
OTHER REFERENCES
Macura, German Application 1,186,412, Printed Jan. 28, 1965, 55—409

Primary Examiner—Frank W. Lutter
Assistant Examiner—Bernard Nozick
Attorney—Davis, Hoxie, Faithfull & Hapgood ABSTRACT: A liquid with entrained gas is fed through a supply pipeline connected coaxially to the suction side of a centrifugal pump, and a gas-discharge pipe has one end portion extending coaxially into the supply pipeline, there being wings arranged to be driven so as to rotate in a path extending around the axis of the gas-discharge pipe and concentric to the pump shaft. The other end portion of the gas-discharge pipe is connected to a vacuum source, and the wings have portions extending axially along this discharge pipe in the vicinity of its opening which receives the gas to be discharged.

Patented Aug. 10, 1971 3,597,904
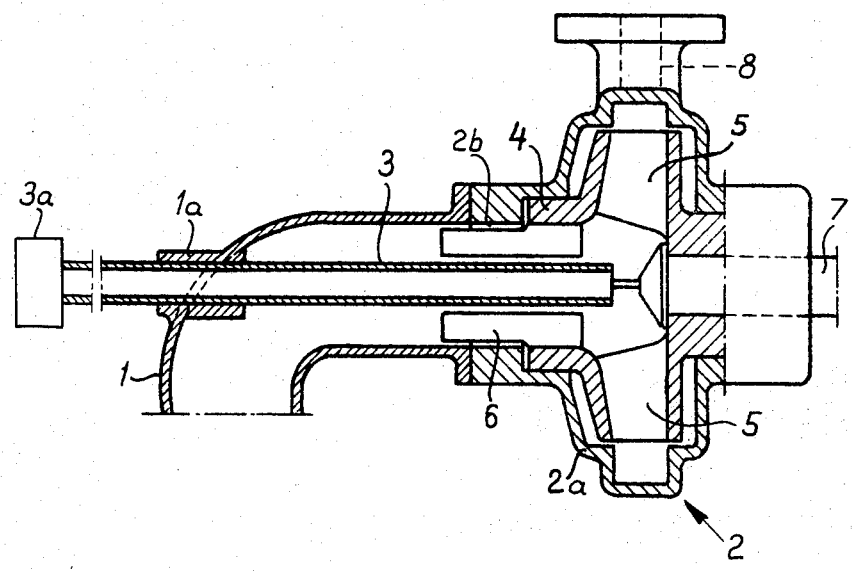
INVENTORS
KARL FOLKE OLOF JAKOBSSON
BO ALBERT VOSS-SCHRADER
BY
Davis, Hoxie, Faithfull & Hapgood
ATTORNEYS

APPARATUS FOR LIQUID-GAS SEPARATION

This invention relates to apparatus for separating a gas from a liquid. It relates more particularly to apparatus for this purpose which comprises a pipeline connected coaxially to the suction side of a centrifugal pump and through which the liquid is supplied to the pump, a gas-discharge pipe having one end portion extending coaxially into the supply pipeline, and wings arranged to be driven so as to rotate in a path extending around the axis of the gas-discharge pipe and concentric to the pump shaft.

Apparatus having the above-described structure is illustrated in FIG. 4 of U.S. Pat. No. 3,323,465, granted June 6, 1967. However, this prior apparatus cannot be used for the present purpose, that is, for effectively degassing a liquid. Such a degassing is desirable for many purposes, as in papermaking where it is most important that the fiber-pulp suspension be well deaerated when led to the papermaking machine. For the latter purpose, for example, a cyclone wherein the suspension is freed from solid impurities is placed under vacuum by means of a pipe extending axially into the cyclone. To some degree, fiber pulp suspension is also sucked into the evacuation pipe. This suspension cannot be allowed to enter a vacuum pump connected to the evacuation pipe, since the pump will then be quickly destroyed by the suspension and particularly by its solid constituents. If it is attempted to solve this problem by leading the fiber-pulp suspension from the evacuation pipe to the inlet of the centrifugal pump shown in said U.S. Pat. No. 3,323,465, and the gas-discharge pipe of such pump is placed under vacuum, even this measure will not prevent pulp fiber suspension from being sucked through the gas-discharge pipe into the vacuum pump, with intolerable consequences.

According to the present invention, this problem is solved by a different arrangement of the wings of the apparatus first described in the introductory part of this disclosure. More particularly, the wings are provided with portions which extend a distance axially along the gas-discharge pipe in the vicinity of its inlet opening which receives the gas to be discharged. With this arrangement, a core essentially free from liquid is formed around said opening of the gas-discharge pipe; whereas such a liquid-free core or space is not obtained when the wings do not extend even as far as to the pipe opening (reckoned from the pump rotor), as is the case according to said U.S. Pat. No. 3,323,465. In accordance with the present invention, the liquid in the vicinity of the inlet opening of the gas-discharge pipe is thrown radially outward to the inside of the pipeline which supplies the liquid, whereby the aforementioned liquid-free core is formed at the pipe opening under the action of centrifugal force, this core being centrally located and maintained under vacuum. In this way, the liquid flowing into the pump is subjected to a strong degassing.

It will be apparent that this manner of degassing can be used not only for the above-described case but also for many other cases in which an effective degassing is desirable.

The invention will now be described in more detail with reference to the accompanying drawing, in which the single illustration is a longitudinal sectional view of one embodiment chosen by way of example.

Referring to the drawing, reference numeral 1 designates a pipeline connected to the inlet of a centrifugal pump 2. A gas discharge pipe 3 extends into pipeline 1, as by way of a hollow boss 1a, the pipe 3 being disposed coaxially of the pump 2 and having its inner end portion extending through the inlet opening 2b of the pump housing 2a. The opposite or outer end of pipe 3 is connected to a vacuum source 3a. The pump rotor 4 carries pump shovels 5, which may be of conventional form, and also carries radial wings 6 extending axially of the rotor. The wings 6 are spaced around the pipe 3 and extend a distance axially along this pipe in the vicinity of its open inner end.

The fiber pulp suspension is supplied to the pump 2 through pipeline 1, which is assumed to be connected to the previously mentioned evacuation pipe of the cyclone (not shown) for purifying paper pulp. In other words, the vacuum in the cyclone is maintained by means of the vacuum source 3a connected to the outer end of pipe 3. The pump rotor 4 is driven by a shaft 7, thereby rotating the shovels 5 and wings 6 about the pump axis. The rotating wings 6 throw the fiber pulp suspension, arriving through pipeline 1, radially outward to the inner wall of the pipeline and to the wall of the inlet opening 2b. Consequently, the suspension forms along these walls a cylindrical layer which surrounds a liquid-free space or core, the latter being kept under vacuum by the suction pipe 3. A similarly constituted space exists at the central portion of the pump rotor 4. Thus, the fiber pulp suspension forms a liquid level situated at a certain distance from the axis of rotation and into which the shovels 5 submerge. It will be understood that by the usual pumping action of these shovels, the fiber pulp suspension is discharged through a suitable outlet 8 of the pump housing.

We claim:

1. Apparatus for separating a gas from a liquid, which comprises a centrifugal pump having a housing provided with an inlet and an outlet, the pump also having a rotor mounted in the housing, a pipeline connected to the pump-housing inlet coaxially of the rotor and through which the liquid is fed to said inlet, a gas-discharge pipe extending into said pipeline and having an inner end portion disposed coaxially of the rotor within the pump housing, a vacuum source connected to the other end portion of the gas discharge pipe, and wings arranged to be driven by means so as to rotate in a path extending around the gas-discharge pipe and concentric to the rotor axis, said wings having portions extending a distance axially along said discharge pipe in the vicinity of its opening at its inner end.

2. Apparatus according to claim 1, in which said wings are carried and driven by the pump rotor.